United States Patent [19]

Duquenne et al.

[11] 4,277,843
[45] Jul. 7, 1981

[54] CLOSED-LOOP TELECOMMUNICATION SYSTEM

[75] Inventors: Michel G. A. Duquenne, Meudon-Bellevul; Guy A. J. David, Thiais; Jean-Claude Grima, Chatillon Sous Bagneux; Jacques L. Daguet, Saint-Maur, all of France

[73] Assignee: U.S. Philips Corporation, New York, N.Y.

[21] Appl. No.: 11,580

[22] Filed: Feb. 12, 1979

Related U.S. Application Data

[63] Continuation of Ser. No. 849,711, Nov. 8, 1977, abandoned, which is a continuation of Ser. No. 666,653, Mar. 15, 1976, abandoned, which is a continuation of Ser. No. 541,728, Jan. 17, 1975, abandoned, which is a continuation of Ser. No. 320,497, Jan. 2, 1973, abandoned.

[30] Foreign Application Priority Data

Dec. 21, 1971 [FR] France .................... 71.45976

[51] Int. Cl.³ .............................................. H04J 3/12
[52] U.S. Cl. .......................................... 370/84; 370/89
[58] Field of Search ............... 179/15 AL, 15 BS; 370/84, 89

[56] References Cited

U.S. PATENT DOCUMENTS

| | | | |
|---|---|---|---|
| 3,529,089 | 9/1970 | Davis et al. | 179/15 AL |
| 3,544,976 | 12/1970 | Collins | 179/15 AL |
| 3,586,782 | 6/1971 | Thomas | 179/15 AL |
| 3,588,365 | 6/1971 | McNeilly et al. | 179/15 AL |
| 3,600,518 | 8/1971 | McNeilly et al. | 179/15 AL |
| 3,689,699 | 9/1972 | Brenig et al. | 179/15 BS |

*Primary Examiner*—Charles E. Atkinson
*Assistant Examiner*—E. S. Kemeny
*Attorney, Agent, or Firm*—T. A. Briody; W. J. Streeter; L. A. Wright

[57] ABSTRACT

This closed loop multiplex communication system uses a timing unit to establish a general multiplex format consisting of 1024 frames in a multiframe. Each subscriber station transmits one message bit per frame (i.e. 1024 message bits per multiframe), but transmits only 32 signalling bits per multiframe (i.e. the eight-bit non-message blocks in four corresponding frames).

5 Claims, 6 Drawing Figures

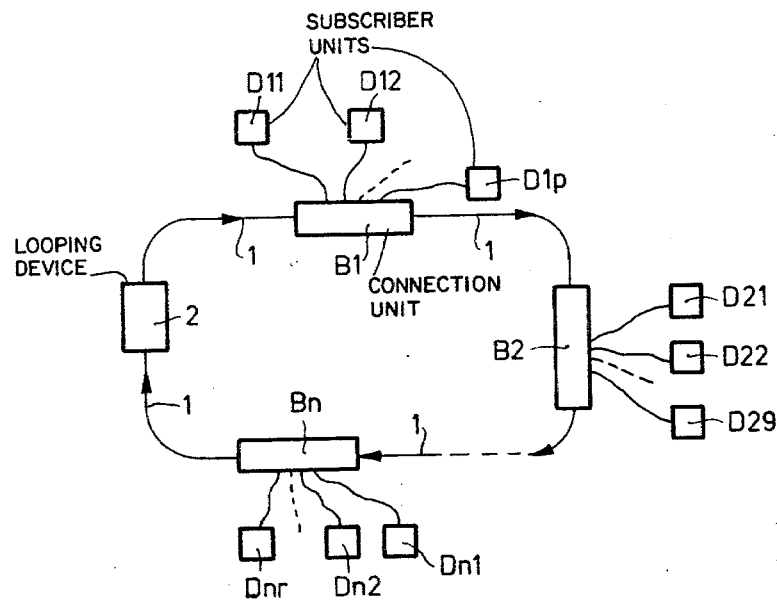
Fig.1
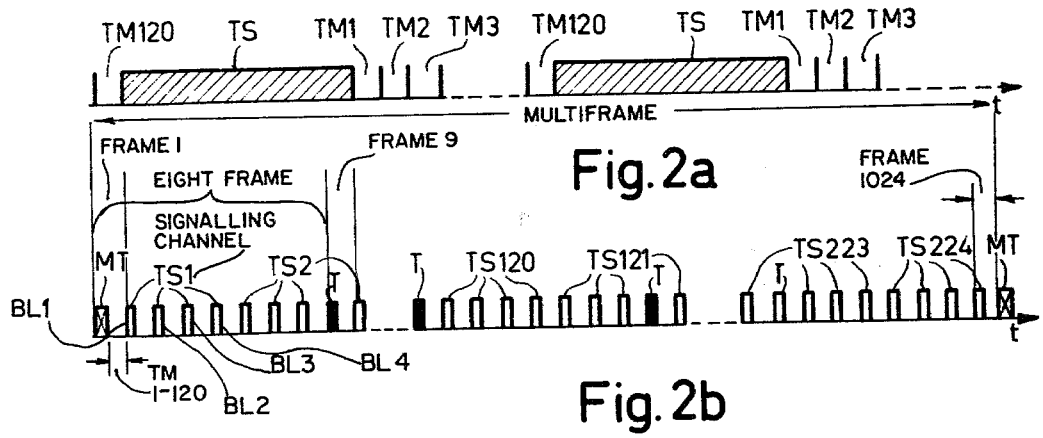
Fig.2a
Fig.2b
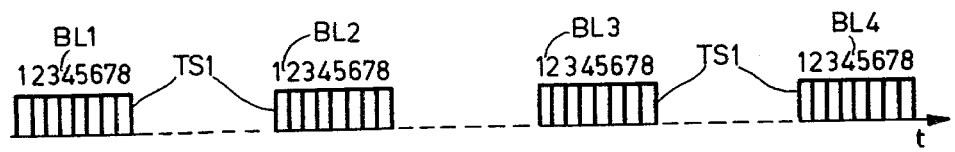
Fig.2c

CLOSED-LOOP TELECOMMUNICATION SYSTEM

This is a continuation of application Ser. No. 849,711, filed Nov. 8, 1977, now abandoned, which was a continuation of Ser. No. 666,653, filed Mar. 15, 1976, now abandoned, which was a continuation of Ser. No. 541,728, filed Jan. 17, 1975, now abandoned, which was a continuation of Ser. No. 320,497, filed Jan. 2, 1973, now abandoned.

The invention relates to a time multiplex telecommunication system utilizing pulse code modulation and comprising a unidirectional transmission line incorporating connection units for connecting to subscriber units, the ends of said line being connected via a looping unit, this looping unit comprising a master clock which determines the timing throughout the system, and comprising a generator which supplies characteristic codes for synchronizing the multiplex channels, the system being conceived to provide an arbitrary free channel whenever a communication is requested by a subscriber, in that each connection unit comprises an input-output device which, opens the transmission line for the duration of the assignment of a channel for the communication, and which connects, on the one side, the receive terminal of the connection unit to the receiving device of the subscriber unit and which, on the other side, connects the send terminal of the connection unit to the transmission device of the subscriber unit.

A system of this kind is known from the French Pat. No. 2,013,794. In this system the subscriber units are all of the same type, notably telephone sets. In this system the speech and the signalling signals relative to a particular communication are contained in the same channel. It may than occur that the speech signals are interpeted as signalling signals which may give rise, for example, to incorrect calls. Moreover, the use of the same channel limits the possibilities of this system, which is poorly adapted to more complex procedures as for example, transfers of calls or telephone conferences.

The present invention provides a system which is more reliable. According to the invention, the telecommunication system is characterized in that, two kinds of channels are provided which are switched at different rates, message channels which are utilized for exchanging information between subscribers, and signalling channels, in one-to-one correspondence with the message channels, for signalling to the relevant connection units at a rate averaged over a given time period (multiframe) which is lower than that of the message channels.

The information in the signalling channels cannot be confused with the information in the message channels, and the risk of errors is substantially reduced.

The invention may be more fully comprehended from the following detailed description taken in conjunction with the drawings in which:

FIG. 1 is a general block diagram of the system.

FIGS. 2A, 2B and 2C illustrate the time intervals associated with the different channels.

Figure 3:
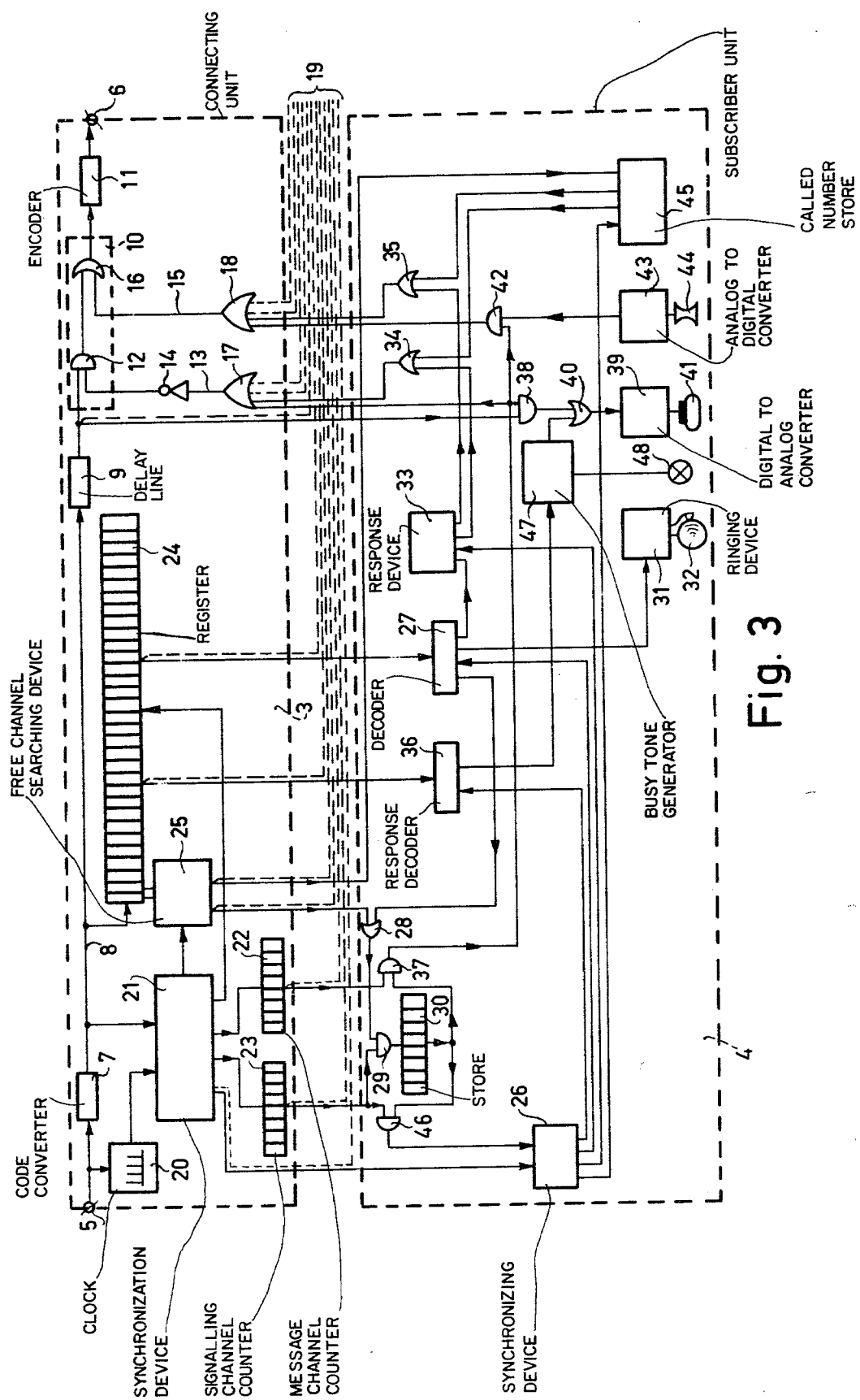
FIG. 3 is the block diagram of a connection unit and a subscriber unit.

In FIG. 1 the transmission line 1 connects the looping unit 2 to the connection unit B1, the connection unit B1 to the unit B2 and so on as far as the unit Bn, n being the number of units in the system. The line 1 also connects the unit Bn to the looping device 2 in order to close the loop. The arrow indicates direction of the signals.

FIG. 2A illustrates the time intervals associated with each channel. In the system which is taken by way of example there are 120 time intervals $TM_1$, $TM_2$, . . . $TM_{120}$ which correspond to the message channels and which are preceded by a time interval TS.

The information is contained in two kinds of channels. On the one hand, message channels having the time intervals $TM_1$, $TM_2$, $TM_3$ . . . $TM_{120}$ and, on the other hand, nonmessage unit channels which use time intervals TS which are inserted between the sequences of 120 time intervals associated with the message channels.

The time intervals TS of FIG. 2A have fixed contents for forming the framing blocks MT and T of FIG. 2B and have variable contents, for forming the signalling blocks TS1, ———, TS224. Four successive variable blocks denoted by a common reference such as TS1 correspond to one signalling channel.

Between two fixed blocks MT, 127 fixed blocks T are regularly arranged. Between two blocks T or between one block MT and one block T, seven variable signalling blocks are found.

The blocks MT are used as a timing reference for the signalling channels. The first four blocks TS1 of variable contents coming after the block MT relate to the first signalling channel; the second group of four variable blocks TS2 relate to the second signalling channel — — —. In this way the four variable blocks TS 224 coming before the next block MT relate to the 224th signalling channel.

A multiframe comprises $224 \times 4 = 896$ blocks of variable contents, a fixed block MT and 127 fixed blocks T i.e. 1024 blocks. A particular one of the 120 time intervals $TM_1$ to TM 120, appears 1024 times between two appearances of the block MT, whereas a particular signalling channel appears only once. The transfer rate of the signalling channels averaged over the multiframe is substantially lower than that of the message channels. It will be assumed that in the time interval of a message channel one bit is transferred and that in a time interval TS eight bits are transferred and that the repetition frequency of the time intervals TS is 38400 Hz. The multiframe average bitrate of a message channel is than 38400 bits/s and that of a signalling channel 1200 bits/s, the multiframe average bitrate of a channel being the number of channels per multiframe multiplied by the multiframe frequency divided by the number of bits per channel. The multiframe repetition frequency is 37.5 Hz.

FIG. 2C illustrates the eight bit positions of each of a succession of four intervals which are associated with one particular signalling channel and in which the four variable blocks of the signalling channel are transferred. Thus for example the block BL1 denotes the first block of the four variable blocks TS1 (FIG. 2B); block BL2 the second block etc.

The bits 1 and 2 of the first block BL 1 indicate whether or not the channel is occupied; the bits 3 to 8 of block BL1 represent the code of the first part of the address of the called subscriber; the bits 1 to 8 of the block BL 2 represent the code of the remainder of the address of the called subscriber. The address of the called subscriber is thus represented by 14 bits. The bits 1 to 8 of block BL 3 represent the answer code. The bits 1 to 8 of block BL 4 are not used in the example shown, they can serve for an extension of the signalling.

The connection units $B_1, B_2 \ldots B_n$ enable the exchange of information between various subscriber units. $D_{11}, D_{12} \ldots D 1p$ which are connected to the unit $B_1$; $D 21, D 22 \ldots D 2q$ which are connected to the unit $B_2$, and $Dn 1, Dn 2 \ldots Dnr$ which are connected to unit $Bn$.

FIG. 3 shows the block diagram of a connection unit 3 and a subscriber unit 4 connected thereto. The unit 3 comprises two terminals on its ends. The terminal 5 at the receive end is connected to the transmission line 1 of FIG. 1, and the terminal 6 at the send end is also connected to this line. On the terminal 5 information is received, and on the terminal 6 information is transmitted. Inside unit 3, the terminal 5 is connected to a device 7 which converts the information received, for example, in bi-phase code on the terminal 5, into an information in the N R Z code which becomes available on line 8. The latter transmits the information to a delay line 9. The information thus delayed passes through the input-output device 10 after which it is encoded by the device 11 into the bi-phase line code before being transmitted via the transmission line 1 which is connected to the terminal 6.

The device 10 comprises an AND-gate 12, two inputs of which receive the signal supplied by the device 9 and the signal present on the line 13 respectively. The latter signal is inverted by the inverter 14 such that if a logic "1" signal is present on the line 13, the gate 12 blocks the information delayed by the device 9. During the time, that gate 12 is blocked it is possible to transmit new information which is presented on a line 15. This new information passes an OR-gate 16, having two inputs, the output of this gate being connected to the device 11.

If the logic signal "0" is present on the line 13, the information arriving from the line 1 passes through the connection unit 3 without being modified. The connection unit 3 then functions solely as a repeater.

The information delayed by the device 9 is applied to all subscriber units connected to the unit 3, and notably to the unit 4. The OR-gates 17 and 18 which are incorporated in the connection unit and whose outputs are connected to the lines 13 and 15, respectively, collect on their inputs, the control signals and the information respectively, originating from all subscriber units. These control signals cause the blocking of the information, such that the new information collected by the gate 18 can be send to the line 1 connected to the terminal 6. The dotted lines 19 denote the connections between other subscriber units and the connection unit 3.

The signals present on the input 5 of the connection unit 3 control a clock device 20 which restores, on the basis of the zero crossovers of these signals, a local clock signal which supplies clock information to a synchronization device 21.

The device 21 comprises an 8-bit shift register, the information present on the line 8 being applied one bit after the other to the input of this register. When a block T is contained in this register, a decoding circuit indicates its presence, thus activating a message channel counter 22, the contents of which thus indicate the position of one of the intervals $TM_1$ to $TM120$ associated with a message channel. As soon as a block MT is stored in said register, it is decoded, this decoding causing the activation of the signalling channel counter 23, the contents of said counter indicating the number of the signalling channel as soon as the first bit of the time interval associated with this channel is present on the line 8.

The device 21 supplies the common register 24 with signals which control the operation of the latter such that this register is filled only with information contained in the time intervals associated with the signalling channels.

The device 21 also supplies the signals which are necessary for the functioning of the free-channel searching device 25 which will be described hereinafter.

The device 21 also supplies the signals to the synchronizing device 26 of each subscriber.

Let us now examine the behaviour of the circuits of FIG. 3 in the case where the subscriber of the subscriber unit 4 is called and, more precisely, when the receiver is on-hook.

The address of the called subscriber is present in the two address blocks corresponding to an arbitrary one of the 120 first signalling channels. All address blocks are examined by a decoder 27, belonging to each subscriber, at instants which are determined by a signal supplied by the device 26. If the examined address is identical to that of the subscriber unit, the device 27 will supply a plurality of signals.

One of the signals will be applied, via an OR-gate 28, to the transfer control unit 29 which is presented in the FIG. 3 by a single AND-gate for the sake of clarity, but it must be understood that there are as many AND-gates as there are bits indicating the positions of the counter 23. The transfer unit 29 permits of the storing of the contents of the signalling channel counter 23 in a store 30 individual to each subscriber. Another signal supplied by the device 27, permanently present as long as the address of the called subscriber is detected, is applied to the ringing device 31 which supplies the necessary voltages for activating the bell 32. A third signal supplied by the device 27 is applied to a response device 33.

In the present situation, i.e. subscriber called and receiver on-hook, the device 33 transmits two signals at the instants indicated by a signal supplied by the device 26, these two signals being applied to device 10. One of these signals causing the blocking of the information delayed by the device 9, while the other signal represents a new information to be transmitted. The blocking signal is applied to the device 10 by way of the OR-gate 34, the output of which is connected to the OR-gate 17 which collects all similar control signals of all subscriber units connected to the connection unit 3. The output of the gate 17 is connected to the inverter 14 by way of the line 13. The new information is applied to the gate 16 by way of the line 15, the OR-gate 18 and an OR-gate 35. This new information is transmitted in the third block of the signalling channel in which the address of the subscriber was detected. This new information is characterized by the sequence of 8 bits: 10001111, for example. This is interpreted at the calling subscriber units, as an indication that ringing is applied to the called subscriber.

The reception of the code 10001111 the subscriber who has placed the call does not immediately cause any change in the operation of the subscriber unit. The address of the called subscriber remains in the signalling channel.

If the calling subscriber replaces the receiver on hook without the called subscriber having answered, the address of the called subscriber is no longer present in the system, removed from the signalling channel and as a consequence the device 27 no longer supplies a signal, whereby the bell 32 of the called subscriber stops ringing.

Lew us now examine the case where the called subscriber takes the receiver off hook.

The removal of the receiver inhibits the functioning of the device 27 so that the bell stops ringing. It also causes the transmission of the code 01110000 by the device 33 which informs the calling subscriber that the called subscriber answers the call. The lifting of the receiver also activates the response decoding device 36. (This has no further consequence in the called subscriber unit).

The comparison signal which is supplied by the comparison device 37, which indicates a coincidence between the message channel counter 22 and the store 30, determines the time interval associated with the message channel. This comparison signal is applied to a gate 38, the opening of this gate enabling the passage of the information delayed by the device 9 to the decoding device 39. This device 39 transforms the digital information into an analog voltage which enables the telephone receiver 41 to restore the speech of the calling subscriber.

The signal which is supplied by comparison device 37 is applied also to a gate 42 which allows passage of a new information supplied by the encoding device 43, which transforms the analog voltages from the microphone 44 into digital signals, to the line 15 by way of the OR-gate 18 which collects the similar informations of the other subscriber units.

The signal supplied by 37 is also applied to the device 10 for interrupting the transmission line by way of the OR-gate 17, the line 13 and inverterly.

The presence of the device 9 will now be justified. First of all it is assumed that this device 9 is not present and that the line 8 connects the device 7 to the device 10 directly.

The comparison between the contents of the message channel counter 22 and of the store 30 is not effected instantaneously and the propagation time between the connection unit 3 and the subscriber unit 4 cannot be ignored. Consequently, if the time interval associated with a mesage channel as determined by the message channel counter 22 corresponds to the time interval on the line 8, the delays of the control logic will cause the signals to be applied too late to the device 10. In order that the signals will be supplied in the correct time interval as determined by the counter 22, the device 9 is connected between the line 8 and the device 10, the device 9 introducing a delay (of a duration corresponding to 5 bits, for example) which compensates for the said delays.

Let us now examine the case where the called subscriber is busy.

The fact that the receiver is off-hook renders the address decoding device 27 inactive, so all blocks corresponding to the signalling channel containing the address of the called subscriber pass through the connection unit without being modified. This is translated at the calling subscriber into a tone for indicating that the called subscriber is busy.

Let us now consider the case where the called subscriber replaces the receiver.

When the subscriber who was communicating replaces the receiver, the device 33 generates a code indicating the end of communication, for example: 01001100, which is transmitted in the third block of the signalling channel.

Let us now examine the case where the subscriber wishes to communicate again with an other subscriber connected to the system. This is the case of the calling subscriber.

The subscriber removes his receiver, composes the number corresponding to the subscriber to be called and dials this number on the dial of the numerating device 45. This number is stored in a store in the device 45, the last digit dialed causing a signal which is applied to the free-channel searching device 25 in the connection unit 3.

This device 25 comprises a counter (not shown), the contents of which correspond to a subscriber unit which is connected to the connection unit. This device 25 performs a test on the first two bits of the block Bl 1 of FIG. 2C as soon as they occupy the first two positions of the common register 24. It than transmits a signal in the direction of the calling subscriber if the two bits indicate a free channel and if the contents of the counter correspond to the calling subscriber device, the signal passes through the gate 28 and causes the contents of the signalling channel counter 23 to be stored in the store 30.

The device 45 generates the address code which is preceded by two bits indicating that the channel is occupied in the blocks Bl1 and Bl2 at the instant indicated by a signal originating from the device 26. This signal is present only if there is coincidence between the contents of the counter 23 and the contents of the store 30. The comparison device 46 applies the indication of such a coincidence to the device 26. In the answer block Bl 3 the device 45 transmits the code: 0000 0000.

If the called subscriber is busy, the complete signalling passes through the loop without being modified. The device 36 of the calling subscriber starts to examine the contents of the block BL3 in the signalling channel whose number is in the store 30. The device 26 generates the signals permitting the device 36 to decode the contents of the block BL3 in the correct signalling channel. The code 0000 0000 causes the device 36 to transmit a signal to the device 47. In response to this signal, the device 47 transmits a busy tone to the telephone receiver 41 by way of a gate 40 and a decoding device 39.

As long as the called subscriber does not answer the device 33 of the called subscriber generates the code 10001111 in the block BL3 as already described. This code causes a ringing tone in the receiver 41 of the calling subscriber by way of the devices 36, 47, the gate 40 and the device 39.

When the called subscriber lifts the receiver, the code 01110000 is transmitted to the calling subscriber. The device 47 then produces a voltage which, when applied to a lamp 48, causes this lamp to light up. The communication can then take place in the same manner as at the called subscriber.

When the subscriber replaces the receiver, the code 01001100 is transmitted indicating the end of communication, and the first two bits of the block BL4 are modified such that they signal that the channel is free. The reception of this code at the calling subscriber causes the transmission of a busy tone to the receiver 41, and the extinguishing of the lamp 48.

The operation of the system is based on the multiframe blocks MT and the frame blocks T which are transmitted by the looping unit 2. After a delay they arrive again at the looping unit. The received blocks are not in phase with the transmitted blocks, and hence all information is shifted and the time intervals overlap each other. Consequently, the looping unit 2 must perform a re-phasing operation so as to ensure that the received information is transmitted at the same relative position with respect to a block MT for the information from the signalling channels, or at the same relative position with respect to a time interval TS for the information from the message channels.

Figure 4:
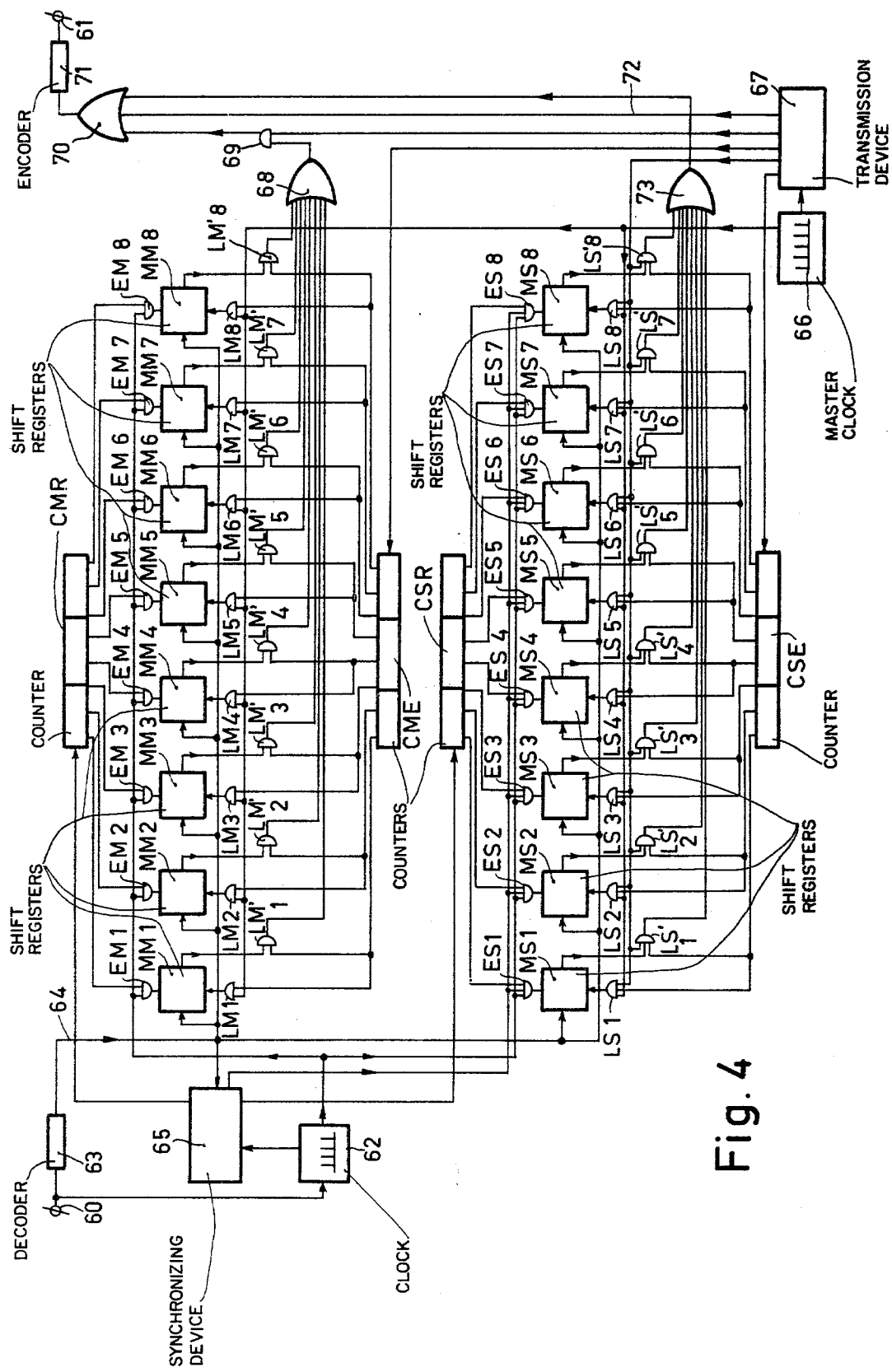
FIG. 4 is the block diagram of the looping unit.

FIG. 4 shows the diagram of the looping unit 2. The line 1 is connected to the unit by way of the terminals 60 at the receive end, and 61 at the transmission end.

The looping unit is provided with two stores. One store is used for the re-phasing of the information from the message channels and is composed of eight shift registers MM 1 to MM 8, each comprising 128 bits. The other store is used for re-phasing the signalling channels and is composed of eight shift registers MS1 to MS 8 each comprising 896 bits.

The received signals are applied to a clock device 62 for restoring the clock, and to a decoding device 63 via a line 64. The information in the N R Z code is treated by a synchronizing device 65 which provides synchronization while detecting the blocks T and MT, and which notably operates two counters.

One of these counters is the 8-position sequence counter CMR. The contents of the counter CMR remain constant during the reception of a sequence of 120 intervals TM 1 to TM 120 and of the block TS preceding these intervals. It is advanced one unit for the next sequence. The decoding of the position 1 of this counter unblocks the gate EM 1 and blocks the gates EM 2 to EM 8 such that only the store MM 1 is filled one bit after the other by the information originating from the line 64. At the next sequence the counter will be advanced by one unit. In the position 2 the gates EM 1 and EM 3 to EM 8 will be blocked and the gate EM 2 will allow the store MM 2 to be filled with the information from the line 64. In the same manner the stores MM 3 to MM 8 will be filled. The store MM 8 is thus filled in the position 8 of the counter CMR. The next position of the counter will be 1 and the store MM 1 will be filled and the cycle will continue.

The synchronizing device 65 also applies a signal to a second 8-position counter CSR which indicates 1 when the first 112 blocks of variable contents associated with the first 28 signalling channels are received by the looping unit. The counter CSR indicates 2 when the next 112 blocks are received, and so on until it indicates 8 for the last 112 blocks before the appearance of a new block MT.

For the position 1, the gates ES 1 will have a logic "1" signal on one of its inputs. A second input will carry a logic "1" signal originating from the device 65 during the time intervals associated with the signalling channels. The information from the line 64 will be stored one bit after the other and this will be the same for the eight positions of the counter CSR which will cause successive filling of the stores MS 1 to MS 8 via the gates ES1 to ES 8.

The information in the stores will be released transmitted in the loop. The transmission takes place at the rate of the master clock 66, the pulses of which are applied to a transmission device 67 which supplies the advancing pulses to the two counters CME and CSE.

The position of the counter CME is constant for the entire duration of a sequence of intervals TM 1 to TM 120 and the preceding block TS.

For the position "1" of the counter CME, a logic "1" signal will be applied to the AND-gates LM 1 and LM'1. The signal from the master transmission clock 66 which is applied to the second input of gate LM 1 starts to empty the store MM 1. The information of said store is transmitted by way of the gate LM'1, the OR-gate 68, the AND-gate 69, the OR-gate 70 and the device 71 which transforms the N R Z code into a bi-phase code.

The device 67 applies signals to the gate 69 such that the latter allows passage of only the bits related to the time intervals associated with the message signals.

The stores MM2 to MM 8 will be emptied in the same manner via the gates LM 1 to LM 8 and the gates LM'1 to LM'8.

The counter CSE indicates 1 as soon as the code generator in the device 67 has transmitted the block MT by way of the line 72 and the gate 70. The position 1 of the counter CSE ensures that the ANd-gates LS 1 and LS'1 have a logic "1" input signal. A second input will receive a "1" signal during the time intervals TS1 to TS 224. The signals of master clock 66 are applied to the third input of LS 1. The store MS 1 will be emptied one bit after the other in the time intervals associated with the signalling channels, the information passing the gate LS'1 and the OR-gate 73, the output of which is connected to the gate 70.

The counter CSE will indicate 2 as soon as the 112 first blocks associated with the signalling channels TS 1 to TS 28 have been transmitted. The position 2 will release the information contained in the store MS 2, and the process will continue until the information of the store MS 8 has been released. The characteristic code generator of device 67 will subsequently transmit the block MT and the counter CSE will indicate 1 again.

The characteristic code generator of the device 67 also transmits blocks T which are regularly distributed in the time between the transmission of two successive blocks MT. The transmission of the blocks MT and T is effected on the line 72 and is accompanied by a signal which blocks the gate 69.

What is claimed is:

1. A time multiplex telecommunication system comprising a unidirectional transmission line, timing means connected to the ends of said line for determining the timing throughout the system, said timing means including means for generating timing signals defining periodically reoccurring multiframes, each multiframe being divided into a plurality of frames of equal time intervals, each frame being divided into a non-message time interval and a plurality of message time intervals of equal duration, each frame having the same number of said message time intervals, each of said message time intervals defining a message channel for exchange of information between subscribers, said timing means further including means for providing on said line a multiframe synchronization code during the first non-message interval of each multiframe and means for providing, during at least one other non-message interval in the multiframe, a frame synchronization code, at least some of the remaining non-message time intervals of each multiframe defining a plurality of signalling channels each associated with a respective one of said message channels, said signalling channels having a repetition rate lower than the repetition rate of said message channels, said system further comprising a plurality of subscriber units and means for connecting said subscriber units to said line, said connecting means including means for detecting a free message channel and, upon request by a subscriber unit, for assigning a free message channel and an associated signal channel to that subscriber unit, means for interrupting transmission of signals through said line during the assignment of a free channel to the requesting subscriber unit, means for providing on said line signalling information such as the address of the subscriber unit to be called or the like during the time interval of a multiframe corresponding to said assigned signalling channel and means for providing on said line message information during the time interval of the multiframe corresponding to said assigned message channel.

2. The system according to claim 1 wherein each of said signalling channels includes at least two of said non-message intervals in each multiframe.

3. The system according to claim 1 wherein said connecting means includes first means for storing the signalling information in a signalling channel, means for counting signalling channels, and means for counting said message channels, and each of said subscriber units includes means coupled to said first storing means for detecting an address code assigned to that subscriber unit, second means for storing the number of the signalling channel assigned to that subscriber, comparator means coupled to said second storing means and said signalling channel counting means for controlling transfer of signalling information to a distant subscriber and second comparator means coupled to said message channel counter for controlling transfer of message information to the distant subscriber.

4. The system according to claim 1 wherein said timing means includes first means for storing the message information received during the message intervals of at least one frame and a second means for storing the signalling information received during the non-message intervals of a multiframe.

5. The system according to claim 1 wherein each frame has one non-message interval which precedes the message intervals of the respective frame and said frame synchronization code is provided during the m-th, 2m-th, ... nth frame of the multiframe, where n is the number of frames of the multiframe and m is a divisor of n.

* * * * *